United States Patent
Krishnan et al.

(10) Patent No.: US 7,672,491 B2
(45) Date of Patent: Mar. 2, 2010

(54) SYSTEMS AND METHODS PROVIDING AUTOMATED DECISION SUPPORT AND MEDICAL IMAGING

(75) Inventors: Sriram Krishnan, Exton, PA (US); Dorin Comaniciu, Princeton Jct., NJ (US); Xiang Sean Zhou, Plainsboro, NJ (US); Michael G. Cannon, Haverford, PA (US); Allen Dutton, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 885 days.

(21) Appl. No.: 11/083,161

(22) Filed: Mar. 17, 2005

(65) Prior Publication Data
US 2005/0251013 A1  Nov. 10, 2005

Related U.S. Application Data (60) Provisional application No. 60/555,620, filed on Mar. 23, 2004.

(51) Int. Cl.
*G06K 9/00* (2006.01)
*A61B 6/00* (2006.01)

(52) U.S. Cl. .......................... 382/128; 382/275; 378/21

(58) Field of Classification Search ................ 382/100, 382/128, 129, 130, 131, 132, 155, 157, 168, 382/170, 181, 203, 224, 232, 260, 274, 276, 382/287, 133, 305, 133.155; 600/300, 425, 600/518; 378/21
See application file for complete search history.

(56) References Cited

U.S. PATENT DOCUMENTS

| | | | |
|---|---|---|---|
| 5,600,574 A |  | 2/1997 | Reitan |
| 6,031,929 A | * | 2/2000 | Maitz et al. .................. 382/132 |
| 6,708,055 B2 | * | 3/2004 | Geiser et al. ................. 600/425 |
| 7,027,633 B2 | * | 4/2006 | Foran et al. .................. 382/133 |
| 7,123,954 B2 | * | 10/2006 | Narayan et al. ............. 600/518 |
| 7,184,582 B2 | * | 2/2007 | Giger et al. .................. 382/128 |
| 7,244,230 B2 | * | 7/2007 | Duggirala et al. ........... 600/300 |
| 2003/0229278 A1 | | 12/2003 | Sinha |

FOREIGN PATENT DOCUMENTS

WO    00/51080 A1    8/2000

OTHER PUBLICATIONS

Annex to Form PCT/ISA/206.
Gagnon et al.. "Procedure to Detect Anatomical Structures in Optical Fundus Images", Proc. SPIE, vol. 4322, 1218 (2001).

(Continued)

*Primary Examiner*—Seyed Azarian (57) ABSTRACT

Systems and methods are provided for processing a medical image to automatically identify the anatomy and view (or pose) from the medical image and automatically assess the diagnostic quality of the medical image. In one aspect a method for automated decision support for medical imaging includes obtaining image data, extracting feature data from the image data, and automatically performing anatomy identification, view identification and/or determining a diagnostic quality of the image data, using the extracted feature data.

26 Claims, 3 Drawing Sheets

OTHER PUBLICATIONS

Lalonde et al., "Automatic Image Quality Assessment in Optical Fundus Images", CRIM Report CRIM-00/12-11, ISBN 2-89522-006-09, Dec. 2000.

Kuhl et al.. "Transthoracic Echocardiography Using Second Harmonic Imaging: Diagnostic Alternative to Transesophageal Echocardiography for the Detection of Atrial Right to Left Shunt in Patients With Cerebral Embolic Events", Journal of the American College of Cardiology, vol. 34, No. 6, 1999, pp. 1823-1830.

Perner, P., "Image mining: issues, framework, a generic tool and its application to medical-image diagnosis", *Engineering Applications of Artificial Intelligence*, Sep. 15, 2001.

Bram Van Ginneken et al., "Computer-Aided Diagnosis in Chest Radiography: A Survey", *IEEE Transactions on Medical Imaging*, vol. 20, No. 12, Dec. 2001.

Annex to Form PCT/ISA/206, 2005.

Canadian Office Action dated Jun. 18, 2009.

* cited by examiner

SYSTEMS AND METHODS PROVIDING AUTOMATED DECISION SUPPORT AND MEDICAL IMAGING

CROSS-REFERENCE TO RELATED APPLICATION

This application claims priority to U.S. Provisional Application Ser. No. 60/555,620, filed on Mar. 23, 2004, which is fully incorporated herein by reference.

TECHNICAL FIELD OF THE INVENTION

The present invention relates generally to systems and methods for providing automated decision support for medical imaging. More specifically, the present invention relates to systems and methods for processing a medical image to automatically identify the anatomy and view (or pose) from the medical image and automatically assess the diagnostic quality of the medical image.

BACKGROUND

In the field of medical imaging, various imaging modalities and systems are used for generating medical images of anatomical structures of individuals for screening and evaluating medical conditions. These imaging systems include, for example, CT (computed tomography) imaging, MRI (magnetic resonance imaging), NM (nuclear magnetic) resonance imaging, X-ray systems, US (ultrasound) systems, PET (positron emission tomography) systems, etc. For each of these modalities, a specific part of the human body is targeted for imaging, which can be performed in various ways. With ultrasound, sound waves from a transducer are directed towards a specific part of the body (the heart, for example). In MRI, gradient coils are used to "select" a part of the body where nuclear resonance is recorded. The part of the body targeted by the imaging modality usually corresponds to the area that the physician is interested in exploring. Each imaging modality may provide unique advantages over other modalities for screening and evaluating certain types of diseases, medical conditions or anatomical abnormalities, including, for example, cardiomyopathy, colonic polyps, aneurisms, lung nodules, calcification on heart or artery tissue, cancer micro calcifications or masses in breast tissue, and various other lesions or abnormalities.

Typically, physicians, clinicians, radiologists, etc., will manually review and evaluate medical images (X-ray films, prints, photographs, etc) reconstructed from an acquired image dataset, to discern characteristic features of interest and detect, diagnose or otherwise identify potential medical conditions. For example, CT image data that is acquired during a CT examination can be used to produce a set of 2D medical images (X-ray films) that can be viewed to identify potential abnormal anatomical structures or lesions, for example. Depending on the skill and knowledge of the reviewing physician, clinician, radiologist, etc., however, manual evaluation of medical images can result in misdiagnosed medical conditions due to simple human error. Furthermore, when the acquired medical images are of low diagnostic quality, it can be difficult for even a highly skilled reviewer to effectively evaluate such medical images and identify potential medical conditions.

SUMMARY OF THE INVENTION

In general, exemplary embodiments of the invention include systems and methods for processing a medical image to automatically identify the anatomy and view (or pose) from the medical image and automatically assess the diagnostic quality of the medical image. For example, in one exemplary embodiment, a method for automated decision support for medical imaging includes obtaining image data, extracting feature data from the image data, and automatically performing anatomy identification, view identification and/or determining a diagnostic quality of the image data, using the extracted feature data.

In another exemplary embodiment of the invention, automated anatomy identification, view identification and/or image quality assessment are performed using associated classifiers that process the extracted feature data. The classifiers can be implemented using machine learning methods, model-based methods, or any combination of machine learning and model-based methods.

In another exemplary embodiment of the invention, automated anatomy identification, view identification and/or image quality assessment can be performed by using the extracted feature data to query a database of known cases to identify similar cases and use information associated with the identified similar cases to perform the respective functions. Training data extracted from the database of know cases can be used to train classifiers for performing such functions.

In another exemplary embodiment of the invention, automated anatomy identification, view identification and image quality assessment are performed by using the extracted feature data to query a database of templates derived from information of known cases to identify similar templates and use information associated with the identified similar templates to perform the respective functions.

In yet another exemplary embodiment of the invention, feature extraction, automated anatomy identification, view identification and image quality assessment are performed in real-time during image acquisition, wherein the results of image quality assessment are presented to a user in real-time during image acquisition. For imaging modalities, such as ultrasound imaging (e.g., 2-D echocardiography) for heart imaging, a sonographer has very limited time to acquire images during a stress stage. By providing a real-time quality assessment of the image acquisition, the sonographer can determine whether the acquired images are of sufficient diagnostic quality, thereby allowing for changes in image acquisition, if necessary.

These and other exemplary embodiments, features and advantages of the present invention will be described or become apparent from the following detailed description of exemplary embodiments, which is to be read in connection with the accompanying drawings.

DETAILED DESCRIPTION OF EXEMPLARY EMBODIMENTS

Figure 1:
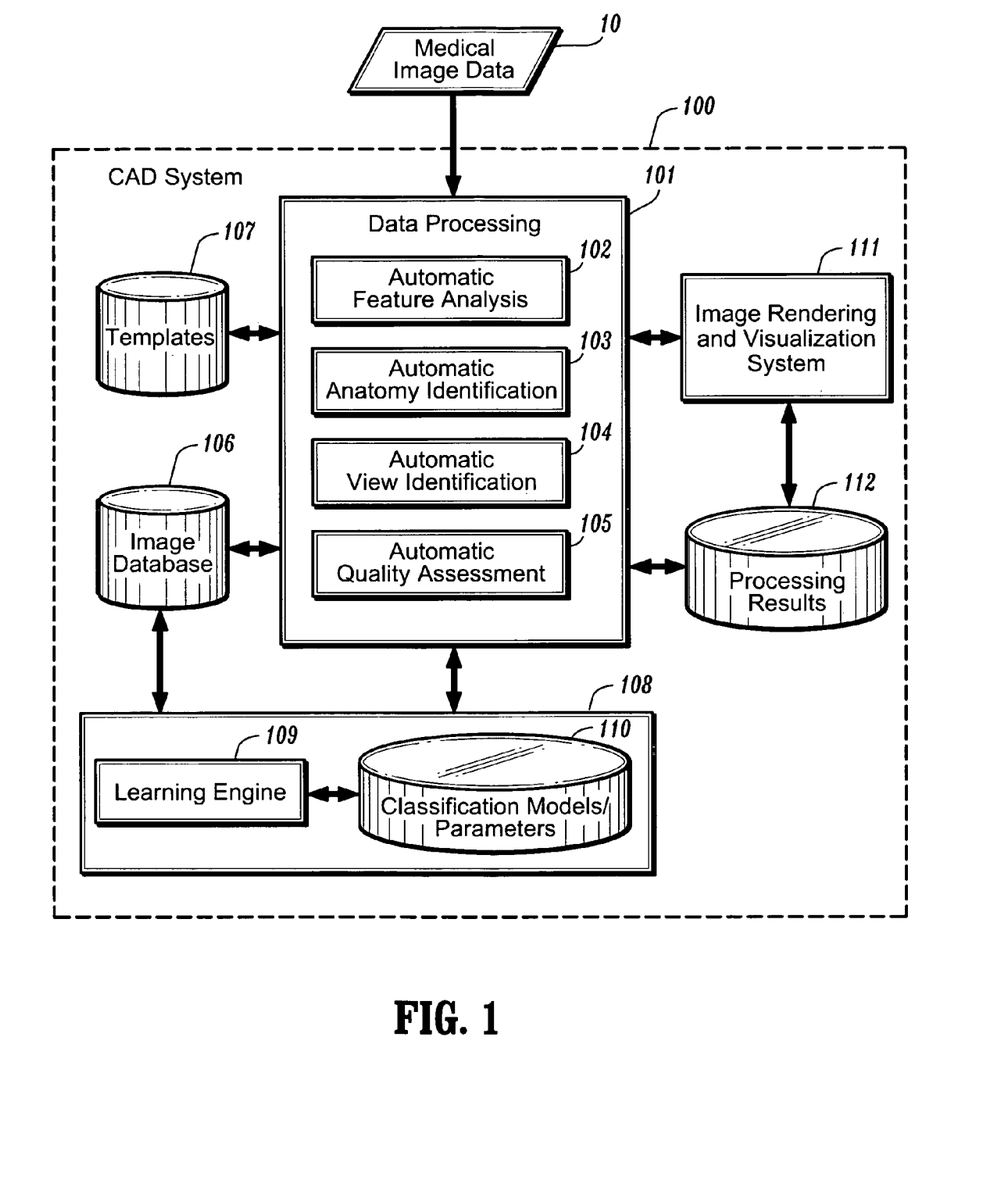
FIG. 1 is a block diagram of a system for providing automated decision support for medical imaging according to an exemplary embodiment of the invention.

FIG. 1 illustrates a high-level block diagram of a system (100) for providing automated decision support for medical imaging, according to an exemplary embodiment of the invention. In general, the exemplary system (100) comprises a data processing module (101) that implements various methods for analyzing medical image data (10) in one or more imaging modalities (e.g., ultrasound image data, MRI data, nuclear medicine data, etc.) to automatically extract and process relevant information from the medical image data to provide various decision support function(s) for evaluating the medical images. In the exemplary embodiment, the data processing module (101) comprises an automatic feature analysis module (102), an anatomy identification module (103), a view identification module (104) and an image quality assessment module (105).

In general, the feature analysis module (102) implements methods for automatically extracting one or more types of features/parameters from input medical image data and combining the extracted features/parameters in a manner that is suitable for processing by the decision support modules (103, 104 and/or 105). The system (100) can process digital image data (10) in the form of raw image data, 2D-reconstructed data (e.g., axial slices), or 3D-reconstructed data (volumetric image data or multiplanar reformats), 4D-reconstructed data, or other image modalities/formats. It is to be understood that methods implemented by the feature extraction module (102) will vary depending on the imaging modalities and/or automated decision support methods that are supported by the CAD system (100), as well as the type(s) of anatomical structures under consideration.

The anatomy identification module (102) implements methods for using the extracted features/parameters to automatically identify anatomical objects (heart chambers, kidneys, etc) in the image dataset and label the image(s) with the appropriate anatomy identification. In another exemplary embodiment, the anatomy identification module (102) implements methods for determining (for each anatomy/view ID label) a confidence or likelihood measure that the identified anatomy/view is properly labeled. The results of anatomy identification for a medical image can be used by other automated methods such as the view identification and quality assessment methods, or other application that provide automated diagnosis, therapy planning, etc.

The view identification module (103) implements methods for using the extracted features/parameters to automatically identify the view of an acquired image. In other words, the view identification module (104) implements methods for pose estimation and label a medical image with respect to what view of the anatomy the medical image contains. By way of example, for cardiac ultrasound imaging, the American Society of Echocardiography (ASE) recommends using standard ultrasound views in B-mode to obtain sufficient cardiac image data—the apical two-chamber view (A2C), the apical four-chamber view (A4C), the apical long axis view (ALAX), the parasternal long axis view (PLAX), the parasternal short axis view (PSAX). Ultrasound images of the heart can be taken from various angles, but efficient analysis of cardiac ultrasound images requires recognizing the position of the imaged heart (view) to enable identification of important cardiac structures. In accordance with an exemplary embodiment of the invention, view identification module (103) implements methods for identifying an unknown cardiac image as one of the standard views. In addition, the view identification module (103) may implements methods for determining (for each view label) a confidence or likelihood measure that the identified view is properly labeled.

The quality assessment module (105) implements methods for using the extracted features/parameters to assess a level of diagnostic quality of an acquired image data set and determine whether errors occurred in the image acquisition process. In other exemplary embodiments of the invention, the results of anatomy and/or view identification may be used for quality assessment. Moreover, methods can be implemented for providing real-time feedback during image acquisition regarding the diagnostic quality of the acquired images, allowing for changes in the image acquisition. In addition, methods can be implemented for determining a quality measure within a predefined range of values to provide an indication as the quality level of the acquired images based on some specified criteria The system (100) further comprises a database (106) of previously diagnosed/labeled medical images, a template database (107) and a classification system (108), which can be used singularly, or in combination, by one or more of the various automated decision support modules (102~105) of the data processing system (101) to perform their respective functions. For example, in one exemplary embodiment, the various modules (103), (104) and (105) implement database querying methods to use extracted feature data to search for similar labeled cases in the database (106). The database (106) may comprise a plurality of labeled/diagnosed medical images for various clinical domains, which are indexed using a multi-dimensional indexing scheme based on relevant features/parameters. In such instance, the features/parameters extracted from an image dataset under consideration can be compared to the feature data of known cases in the database (106) according to some metrics or criteria identify the particular anatomy or view, or help identify the quality of the image extracted.

In another exemplary embodiment, the various modules (103), (104) and (105) can implement template-based methods to use extracted feature data to search for similar templates in template database (107). In particular, various templates can be constructed using information obtained from the database of cases (106). For example, feature data over a plurality of known cases for a given identity and view can be processed using statistical techniques to derive feature data for a template representative over the set of related cases. In this instance, the features/parameters extracted from an image dataset under consideration can be compared to the feature data for templates in the database (107) according to some metrics or criteria identify the particular anatomy or view, or help identify the quality of the image extracted.

In another exemplary embodiment, the various modules (103), (104) and (105) can implement classification methods that utilize the classification module (108) to process extracted feature data to classify the image dataset under consideration. In the exemplary embodiment of FIG. 1, the classification module (108) comprises a learning engine (109) and knowledge base (110) to implement a principle (machine) learning classification system. The learning engine (109) includes methods for training/building one or more classifiers using training data that is learned from the database (106) of previously diagnosed/labeled cases. The classifiers are implemented by the various decision support modules (102~105) for performing their respective functions.

The processing results generated by the various modules of the data processing module (101) can be persistently stored in a repository (112) in association with the corresponding image dataset. The processing results may comprise meta information for superposition of markers, segmentation, color or intensity variations, and so forth, which can be rendered as overlays on the associated image data.

The system (100) further comprises an image rendering and visualization system (111) to process digital image data (10) of an acquired image dataset (or a portion thereof) and generate and display 2D and/or 3D images on a computer monitor. More specifically, the imaging system (111) may be any application that provides 3D/2D rendering and visualization of image data (10), and which executes on general purpose or specific computer workstation having a monitor. Moreover, the imaging system (111) comprises a GUI (graphical user interface), for example, which enables a user to navigate through a 3D image or a plurality of 2D slices.

The data processing system (101) and image rendering and visualization system (111) may be implemented as a single application that executes in a computing system (e.g., workstation). Alternatively, the systems (101) and (111) may be independent tools that are distributed over a computer network, wherein known communication protocols such as DICOM, PACS, etc. are used for communicating between the systems and transmitting image data over the network.

It is to be appreciated that exemplary methods for automatic anatomy and view identification and image quality assessment are powerful tools that provide substantial assistance and decision support in medical imaging acquisition and evaluation. Indeed, when medical images are acquired, it is important to properly label the images with proper anatomy and view so that a physician can perform a proper diagnosis. Currently, labeling is done manually, either by a technologist acquiring the scan, or by the physician. With exemplary labeling methods described herein, the system automatically identifies the anatomy and view being imaged, which provide various advantages. For instance, automated anatomy identification improves physician workflow by eliminated manual labeling. Moreover, automated anatomy identification facilitates automated quality control, and other automated computer applications that aid in diagnosis, therapy planning, or other applications.

Further, automated view identification methods according to the invention could provide significant workflow enhancement for medical imaging applications, such as 2-D echocardiography, and specifically stress-echo. In stress-echo, the sonographer has a very limited time (90 seconds or so for exercise stress) to acquire images from four different views. To save time, the sonographer often just records for a significant portion of the 90 seconds, and then proceed to label the views after imaging is done. This is a cumbersome process, and could be improved by automatically identifying the views.

The results of anatomy identification and/or view identification can be used to perform automatic image quality assessment process according to an exemplary embodiment of the invention. The quality check would assess the quality of the acquired images, and also whether there are any errors in how the image was acquired. For example, in 2-D echocardiography, it is difficult to properly image the apex from the apical window. Typically, images will be acquired with the apex foreshortened, that is, the transducer is angled so that the apex appears thicker than it actually is, which gives an impression of a thicker myocardium at the apex. However, other clues in the image may suggest that the apex was indeed foreshortened.

For example, foreshortening can be identified by measuring the distance on the ultrasound image from the base of the left ventricle to the apex, and the thickness of the myocardium at the apex. This distance can be compared to the distance acquired in previous exams, or with typical values associated with hearts of the same size of the patient, and than assessed to determine the existence, if any, of foreshortening. In addition, the thickness of the myocardium at the apex is another metric that can be evaluated to identify potential foreshortening. If the apical myocardium is significantly thicker than the rest of the heart, then it can be concluded that the view may have been foreshortened. Another approach would be to have a set of images which are foreshortened, and another set of correctly acquired images with no foreshortening, which are stored in a database. Using a similarity metric, the database can be searched to determine whether a current image is more similar to the set of foreshortened images or correctly acquired images.

Another problem could be identification of motion artifacts in MRI. Because MRI are acquired in "k-space", and not real space, motion during image acquisition can result in strange results. By analyzing the quality of the images, motion artifacts can be identified.

In addition to searching for problems, the automatic image quality assessment can be implemented to provide general feedback on the diagnostic quality of an image. For example, with 2-D echocardiography, particularly stress-echo, the sonographer has very limited time to acquire images during a stress stage. It is important for the sonographer to acquire, as quickly as possible, diagnostic quality images at multiple views. Many times, because of the time pressure of a stress-echo, diagnostic quality images are not obtained, and the images are useless. By providing a quality check, the sonographer can be assured that images are being acquired of diagnostic quality. The advantage of doing such a quality check is that feedback can be provided back to the operator of the imaging device in real time, allowing for changes in acquisition. This could be very important in a medical situation. If the feedback is provided quickly, there may be an opportunity to re-image the patient before he is sent home or discharged. In addition, there may be other advantages. For example, again in stress-echo, another application would be to automatically select the images of highest quality for the cardiologist to review. Often in stress-echo, the sonographer acquires up to four (and sometimes more) loops of data for each view, where each loop represents a heart cycle, or at least the systole portion of the heart cycle. Typically, either the sonographer or cardiologist selects which of the loops provides the best images from a diagnostic standpoint, and uses them. By providing a quality check, this could be done automatically.

Figure 2:
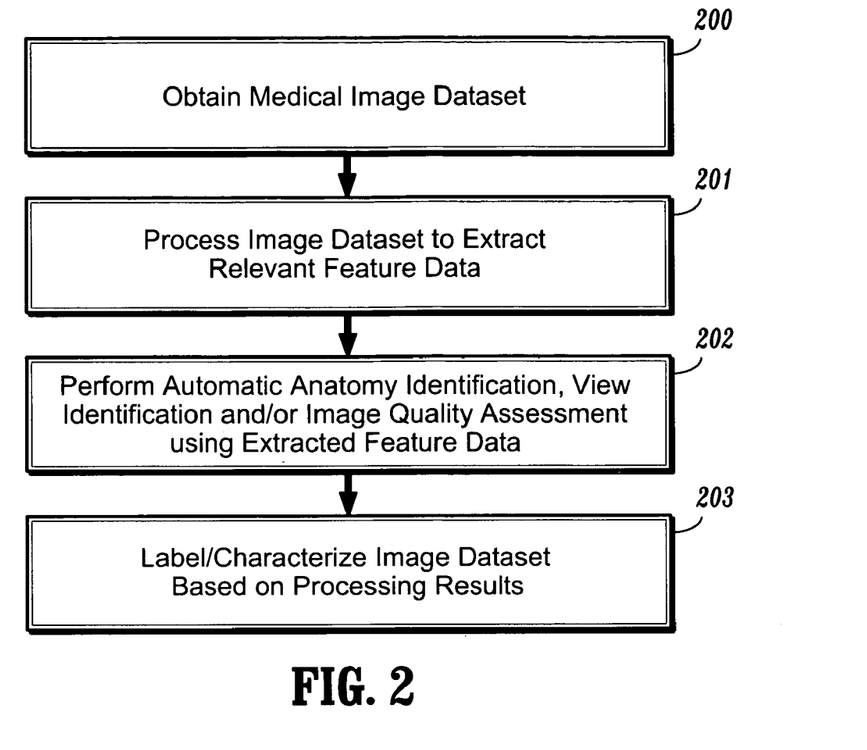
FIG. 2 is a flow diagram illustrating methods for automated decision support for medical imaging according to exemplary embodiments of the invention.

Referring now to FIG. 2, a flow diagram illustrates methods for providing automated decision support for medical imaging, according to exemplary embodiments of the invention. For purposes of illustration, exemplary methods for automated decision support will be described with reference to the exemplary system of FIG. 1. Initially, a physician, clinician, radiologist, etc., will obtain a medical image dataset comprising one or more medical images of a region of interest of a subject patient (step 200). The image dataset may be obtained using a medical imaging system for real-time acquisition and processing of raw image data, such as raw CT data (radon data) which is acquired during a CT scan or raw data that is acquired using other imaging modalities. Alternatively, the image dataset may be obtained by accessing a previously acquired, and persistently stored image dataset. The digital image data (10) may comprise one or more 2D slices or three-dimensional volumetric images, which are reconstructed from the raw image data and persistently stored. As noted above, an exemplary CAD process can support one or more imaging modalities such as MRI, PET, etc. Image data can be 2D (e.g. X-ray Mammography images), 3D (e.g. CT, MRI, PET), 4D (Dynamic 3D MRI, multiple views of a beating heart acquired with a 3D Ultrasound probe), etc.

Next, the image dataset will be processed to determine or otherwise extract relevant feature data from the image dataset (step 201) which is utilized to perform one or more decision support functions such as automatic anatomy identification, view identification and/or image quality assessment (step 202). As noted above, the relevant features/parameters that are extracted/determined from the image dataset will vary depending on the imaging modality, the supported clinical domains, and the methods implemented for providing automated decision support, and one of ordinary skill in the art can readily envision various types of feature data or parameters that can be extracted or determined from medical image data for use with automated anatomy and view identification methods and image quality assessment methods according to exemplary embodiments of the invention. For example, various parameters related to optical density and contrast can be extracted Feature extraction can implement known segmentation and/or filtering methods for segmenting features or anatomies of interest by reference to known or anticipated image characteristics, such as edges, identifiable structures, boundaries, changes or transitions in colors or intensities, changes or transitions in spectrographic information, etc, using known methods. These features could include any kind of characteristic that could be extracted from the image, such as a particular shape or texture. Further, various types of feature data can be obtained across images, such as motion of a particular point, or the change in a particular feature across images. In other embodiments, feature data may include gradient feature data that is computed from image data along various axes (x, y, z), distributions of pixel intensities, or other statistical features, or combinations of different features.

Methods for automatic anatomy identification, automatic view identification and image quality assessment (step 202) according to exemplary embodiments of the invention can be implemented using one or more techniques including a database query approach (e.g., FIG. 3), a template processing approach (e.g., FIG. 4) and/or classification (e.g., FIG. 5) that utilize the extracted features to provide automated decision support functions.

The image dataset will be labeled or otherwise classified based on the processing results obtained (step 203). For instance, for anatomy and view identification, a medical image will be labeled with the appropriate anatomy and view identification. In addition, for each anatomy/view ID label, a confidence or likelihood measure that the identified anatomy/view is properly labeled. Moreover, for image quality assessment, the medical images may include a quality score (within a predefined range) that provides an indication a diagnostic quality level of the medical images.

Figure 3:
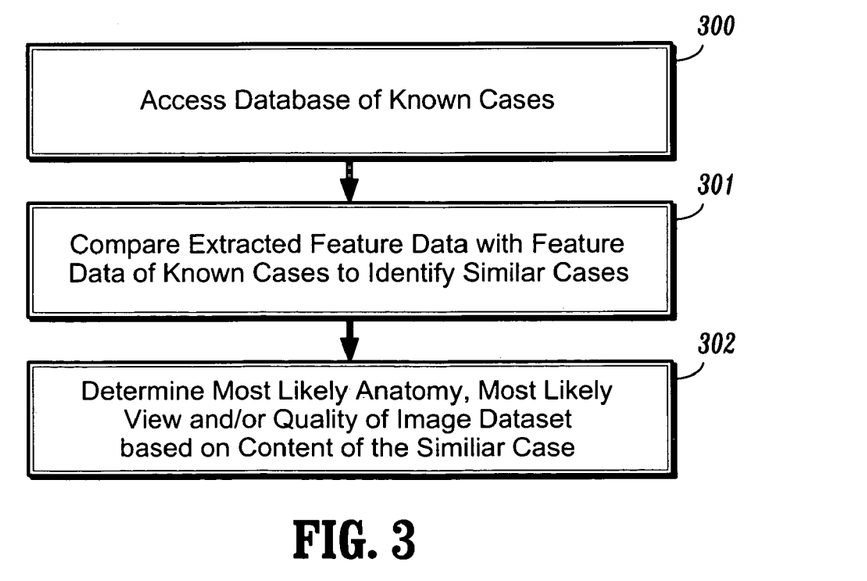
FIG. 3 is a flow diagram illustrating methods for implementing automated decision support for medical imaging using database query methods according to exemplary embodiments of the invention.

FIG. 3 is a flow diagram illustrating methods for implementing automated decision support for medical images using database query methods according to exemplary embodiments of the invention. The methods of FIG. 3 may be implemented by the modules (103), (104) and/or (105) of FIG. 1 and in step 202 of FIG. 2. In one exemplary embodiment, a query can be formulated using the feature data extracted from the image dataset and the database of known cases would be accessed (step 300) and searched using the query. The extracted feature data comprising the query would be compared to features of known cases to identify similar cases (step 301). The content of the identified cases would then be used to determine the most likely anatomy or view for the subject image, or to determine the quality of the acquired image (step 302).

For example, consider the problem of identifying the apical four-chamber view in echocardiography. A set of typical apical four chamber views would reveal a number of features, such as the presence of four chambers, and a general shape for the heart. It is also described by the lack of other features, such as the absence of the aortic outflow track (which would lend itself to the so-called apical five chamber view). These features could be extracted from a test image, and compared to a set of features from the known view.

The same concept would be used in anatomy identification. For example, consider an ultrasound image of a kidney. Features would be extracted and compared with a database of cases representing all kinds of anatomy, including liver, gall bladder, kidney, etc. One could even have right and left kidneys in the database. Based on a comparison with these known cases, and the most likely anatomy would be reported.

Methods for indexing a database of images, and using low-level features to search the database can be implemented using the techniques disclosed in commonly assigned U.S. patent application Ser. No. 10/703,024, filed on Nov. 6, 2003, entitled "System and Method for Performing Probabilistic Classification and Decision Support Using Multidimensional Medical Image Databases", which is incorporated herein by reference. In one embodiment, the database could be constructed with either the images, or with just the feature representations of the images. The system could identify similar images, and then determine anatomy, view and/or quality based on the content of the similar images.

Figure 4:
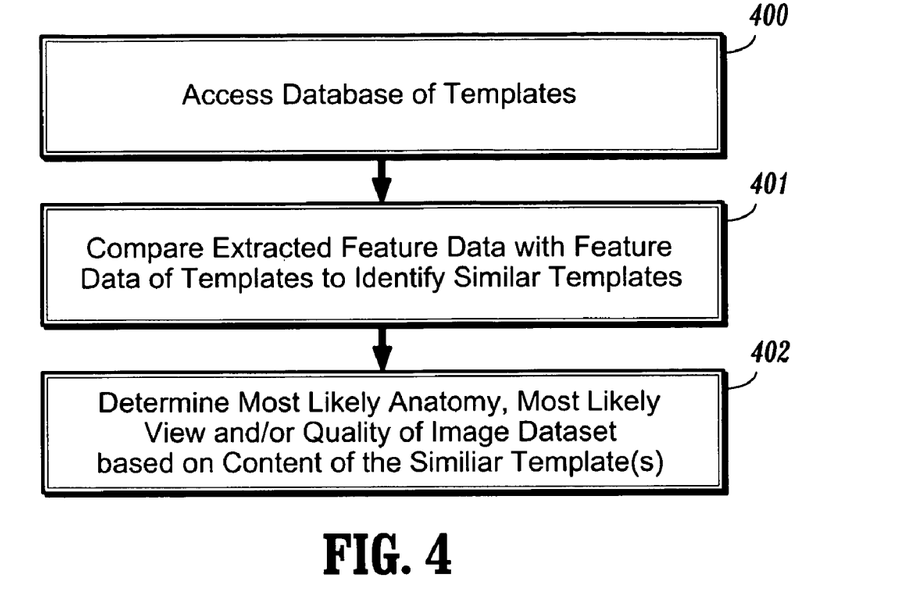
FIG. 4 is a flow diagram illustrating methods for implementing automated decision support for medical imaging using template-based methods according to exemplary embodiments of the invention.

FIG. 4 is a flow diagram illustrating methods for implementing automated decision support for medical images using template-based methods according to exemplary embodiments of the invention. In one exemplary embodiment, a query can be formulated using the feature data extracted from the image dataset and the database of templates would be accessed (step 400) and searched using the query. The extracted feature data comprising the query would be compared to features of the templates to identify similar templates (step 401). The content of the identified templates would then be used to determine the most likely anatomy or view for the subject image, or to determine the quality of the acquired image (step 402). As noted above, the database of known cases could be used to construct templates. For example, templates could be constructed for different cardiac views: apical four chamber, apical two chamber, etc. The system could then assess similarity to each of these templates, which provides a simpler operational approach then searching a database.

Figure 5:
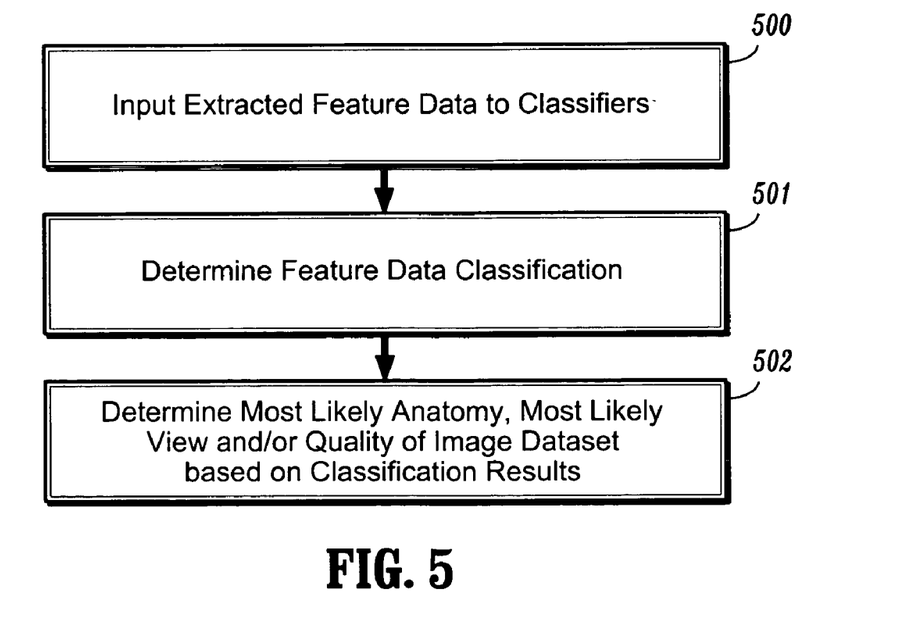
FIG. 5 is a flow diagram illustrating methods for implementing automated decision support for medical imaging using classification according to exemplary embodiments of the invention.

FIG. 5 is a flow diagram illustrating methods for implementing automated decision support for medical images using classification according to exemplary embodiments of the invention. In this exemplary embodiment, the feature data extracted from the image dataset would be input to classifiers (step 500) that are trained or designed to process the feature data to classify the image data (step 501). The classification results would be used to determine the most likely anatomy or view, or assess image quality (step 502).

For example, a bank of classifiers could be constructed to classify the images based on the features extracted. That is, a set of classifiers would be "learned" based on a database of cases. These classifiers would use the set of features as an input, and classify the image as belonging to a particular anatomy, view, or level of quality. In the exemplary embodiment of FIG. 1, the classification system (108) includes the knowledge base (110) that is used to process the extracted features/parameters and classify the images. The knowledge base (110) maintains one or more trained classification models, parameters, and/or other data structures of learned knowledge, etc.

It is to be understood that the term "classifiers" as used herein generally refers to various types of classifier frameworks, such as hierarchical classifiers, ensemble classifiers, etc. In addition, a classifier design can include a multiplicity of classifiers that attempt to partition data into two groups and organized either organized hierarchically or run in parallel and then combined to find the best classification. Further, a classifier can include ensemble classifiers wherein a large number of classifiers (referred to as a "forest of classifiers") all attempting to perform the same classification task are learned, but trained with different data/variables/parameters, and then combined to produce a final classification label. The classification methods implemented may be "black boxes" that are unable to explain their prediction to a user (which is the case if classifiers are built using neural networks, example). The classification methods may be "white boxes" that are in a human readable form (which is the case if classifiers are built using decision trees, for example). In other embodiments, the classification models may be "gray boxes" that can partially explain how solutions are derived (e.g., a combination of "white box" and "black box" type classifiers).

It is to be understood that the systems and methods described herein in accordance with the present invention may be implemented in various forms of hardware, software, firmware, special purpose processors, or a combination thereof. For example, the systems and methods described herein can be implemented in software as an application comprising program instructions that are tangibly embodied on one or more program storage devices (e.g., hard disk, magnetic floppy disk, RAM, CD Rom, DVD, ROM and flash memory), and executable by any device or machine comprising suitable architecture. In addition, because the constituent system modules and method steps depicted in the accompanying Figures can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

It is to be further understood that systems and methods according to the present invention may be implemented as extensions to conventional CAD methods or other automated diagnostic methods for processing image data. Further, it is to be appreciated that the exemplary systems and methods described herein can be readily implemented with 3D medical imaging and CAD systems or applications that are adapted for a wide range of imaging modalities (CT, MRI, etc.) for diagnosis and evaluation. In this regard, although exemplary embodiments may be described herein with reference to particular imaging modalities or particular anatomical features, nothing should be construed as limiting the scope of the invention.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A computer readable medium embodying instructions executed by a processor to perform a method for providing automated decision support for medical imaging, the method comprising:
   obtaining an image comprising image data;
   extracting feature data from the image data; and
   automatically assessing an error in the image using the extracted feature data, wherein the error corresponds to a diagnostic quality on the image;
   wherein automatically assessing an error is performed by using the extracted feature data to query a database of templates derived from information of known cases to identify similar templates and use information associated with the identified similar templates to determine the diagnostic quality.

2. The method of claim 1, wherein the image data comprises cardiac ultrasound image data.

3. The method of claim 1, further comprising automatically determining a metric that indicates a level of assessed diagnostic quality, wherein the error is a deviation in the image from an expected image.

4. The method of claim 1, wherein automatically assessing image quality is performed by processing the extracted feature data using a classifier to determine the diagnostic quality.

5. The method of claim 4, wherein the classifier is implemented using a machine learning method, a model-based method, or any combination of machine learning and model-based methods.

6. The method of claim 1, wherein automatically assessing diagnostic quality is performed by using the extracted feature data to query a database of known cases to identify similar cases and use information associated with the identified similar cases to determine the diagnostic quantity.

7. The method of claim 1, further comprising automatically identifying and labeling an anatomical object of the image data using the extracted feature data.

8. The method of claim 1, wherein automatically assessing diagnostic quality of the image further comprises using results of automatic anatomy identification.

9. The method of claim 1, further comprising automatically identifying and labeling a view of the image using the extracted feature data.

10. The method of claim 9, wherein automatically assessing diagnostic quality of the image further comprises using results of automatic view identification.

11. The method of claim 9, wherein the view is a standard view for a clinical domain of interest.

12. The method of claim 1, wherein automatically assessing diagnostic quality of the image using the extracted feature data is performed in real-time during image acquisition.

13. The method of claim 12, further comprising presenting assessed diagnostic quality results to a user in real-time during image acquisition.

14. A computer readable medium embodying instructions executed by a processor to perform a method for providing automated decision support for medical imaging, the method comprising:
   obtaining an image comprising image data;
   extracting feature data from the image data;
   performing an automatic anatomy identification process using the extracted feature data to label an identified anatomical object in the image data;

performing an automatic view identification process using the extracted feature data and results of anatomy identification to label a view of the image data; and performing an automated image quality assessment process using the extracted feature data and results of anatomy and view identification to assess a level of diagnostic quality of the image, wherein the diagnostic quality corresponds to error introduced in an image acquisition process;

wherein automatically assessing an error is performed by using the extracted feature data to query a database of templates derived from information of known cases to identify similar templates and use information associated with the identified similar templates to determine the diagnostic quality.

15. The method of claim 14, wherein automated anatomy identification, view identification and diagnostic quality assessment are performed in real-time during image acquisition.

16. The method of claim 15, further comprising presenting results of the automated anatomy identification, view identification and diagnostic quality assessment processes to a user in real-time during image acquisition.

17. The method of claim 14, wherein automated anatomy identification, view identification and diagnostic quality assessment are performed using associated classifiers that process the extracted feature data.

18. The method of claim 17, wherein the classifiers are implemented using a machine learning method a model-based method, or any combination of machine learning and model-based methods.

19. The method of claim 14, wherein automated anatomy identification view identification and diagnostic quality assessment are performed by using the extracted feature data to query a database of known cases to identify similar cases and use information associated with the identified similar cases to perform the respective functions.

20. The method of claim 14, wherein automated anatomy identification view identification and diagnostic quality assessment are performed by using the extracted feature data to query a database of templates derived from information of known cases to identify similar templates and use information associated with the identified similar templates to perform the respective functions.

21. A computer readable medium embodying instructions executed by a processor to perform a method for providing automated decision support for medical imaging, the method comprising:

obtaining an image comprising image data;

extracting feature data from the image data; and performing an automatic view identification process using the extracted feature data to identify a view of the image; and performing an automated image quality assessment process using the extracted feature data and results of view identification to assess a level of diagnostic quality of the image, wherein the diagnostic quality corresponds to error introduced in an image acquisition process;

wherein automatically assessing an error is performed by using the extracted feature data to query a database of templates derived from information of known cases to identify similar templates and use information associated with the identified similar templates to determine the diagnostic quality.

22. The method of claim 21, wherein the image data comprises image data of a heart acquired using ultrasound imaging.

23. The method of claim 22, wherein a view is identified as an apical two-chamber view (A2C), an apical four-chamber view (A4C) an apical long axis view (ALAX), the parasternal long axis view (PLAX), or a parasternal short axis view (PSAX).

24. The method of claim 21, wherein the automated diagnostic quality assessment process includes evaluating the image to identify a foreshortened myocardium apex, wherein the image is a cardiac image.

25. The method of claim 24, wherein automatically determining diagnostic quality of the image using the extracted feature data is performed in real-time during image acquisition.

26. The method of claim 25, further comprising presenting diagnostic quality determination results to a user in real-time during image acquisition, wherein the error is a deviation in the image from an expected image.

* * * * *

UNITED STATES PATENT AND TRADEMARK OFFICE
CERTIFICATE OF CORRECTION

PATENT NO. : 7,672,491 B2
APPLICATION NO. : 11/083161
DATED : March 2, 2010
INVENTOR(S) : Krishnan et al.

It is certified that error appears in the above-identified patent and that said Letters Patent is hereby corrected as shown below:

On the Cover Page, FIELD [54], the title: SYSTEMS AND METHODS PROVIDING AUTOMATED DECISION SUPPORT "AND" MEDICAL IMAGING, should read -- FOR -- as written, for example, in the Declaration filed June 13, 2005.

On the Cover Page, FIELD [73] "Assignee: Siemens Medical Solutions USA, Inc., Malvern, PA (US)" should further include -- Siemens Corporate Research, Inc., Princeton, NJ (US) -- in order to correctly list both Assignees as provided in the Assignments recorded on June 13, 2005 and July 5, 2005, at Reel/Frame 016128/0015 and 016219/0818, respectively.

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,672,491 B2 | Page 1 of 1 |
| APPLICATION NO. | : 11/083161 | |
| DATED | : March 2, 2010 | |
| INVENTOR(S) | : Krishnan et al. | |

It is certified that error appears in the above-identified patent and that said Letters Patent is hereby corrected as shown below:

On the Title Page, Item [54], and Column 1, lines 1-3, the title should read: -- SYSTEMS AND METHODS PROVIDING AUTOMATED DECISION SUPPORT FOR MEDICAL IMAGING --.

On the Title Page, Item [73] "Assignee: Siemens Medical Solutions USA, Inc., Malvern, PA (US)" should further include -- Siemens Corporate Research, Inc., Princeton, NJ (US) -- in order to correctly list both Assignees as provided in the Assignments recorded on June 13, 2005 and July 5, 2005, at Reel/Frame 016128/0015 and 016219/0818, respectively.

This certificate supersedes the Certificate of Correction issued May 18, 2010.

Signed and Sealed this

Fifteenth Day of June, 2010

David J. Kappos
*Director of the United States Patent and Trademark Office*